Feb. 22, 1927.

R. DAIKER

MICROMETER GAUGE

Filed Sept. 12, 1922

1,618,173

Inventor
R. Daiker
by Langner, Parry, Card & Langner
Attys.

Patented Feb. 22, 1927.

1,618,173

UNITED STATES PATENT OFFICE.

RICHARD DAIKER, OF FELLBACH, WURTTEMBERG, GERMANY.

MICROMETER GAUGE.

Application filed September 12, 1922, Serial No. 587,781, and in Germany September 12, 1921.

The transmission of the movement of the feeler in measuring implements to the device which actuates an indicator, is attended with difficulties, more particularly when the two devices are movable longitudinally and are situated at an angle relative to one another.

The present invention relates to an arrangement in which the movement of the feeler in such cases is transmitted in a simple and accurate manner, whereby a very accurate measurement is obtained. The invention is moreover distinguished by its simplicity which, in turn is a factor in the accuracy of the measuring.

The invention consists in the employment as a transmission device, of a body in the form of an arc of a circle, loosely movable in a correspondingly shaped guide, which is pushed by the touch bolt or feeler and in turn moves the indicator actuating device to precisely the same degree. The movable transmission device is so arranged that there is no play and such that it cannot occur in the course of time. One end of the device bears against the face of the feeler and the other end bears against the end of the indicator actuating device or an extension thereof.

Provision is also made so that, in the case of cylindrical hollow bodies, it is assured that measurement must be made on the largest diameter.

Figure 1:
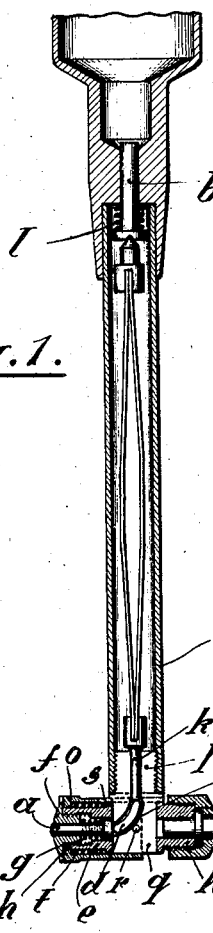
Figure 2:
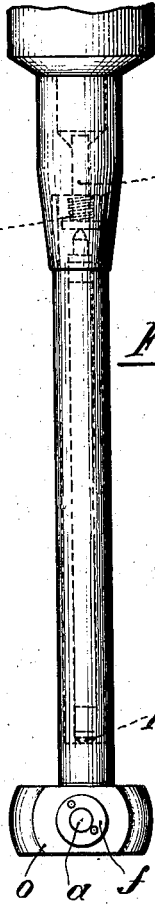
Figure 3:
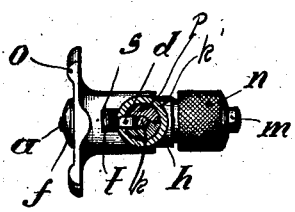

One form of the invention is illustrated by way of example in the accompanying drawings, wherein:

Fig. 1 is an axial section of the device,
Fig. 2 is a front elevation, and
Figure 3 is a plan view with parts broken away.

In general, the feeler $a$ is arranged to move longitudinally and is situated at an angle, in the present example of construction at a right angle, to the indicator actuating device $b$, which is likewise movable longitudinally in order that its movement actuate an indicator (not shown) of any conventional design. A transmission device, $d$, in the form of an arc of a circle, is arranged to slide loosely in a correspondingly shaped guide $i$. One end of device $d$ bears against the face of the feeler $a$ and the other bears against the face of a rod —$k$— in line with and forming an extension of the actuating device $b$ which latter is thereby moved to the same degree as is the feeler $a$.

As shown in Figs. 1—3, the feeler $a$ is guided in a bush $e$ and a nut $f$ that is screwed into the latter. It is acted on by a spring $g$ tending to press it inwards. It bears against the transmission device $d$, which, as stated, is constructed as a sliding piece, in the form of an arc of a circle, and guided in the head $h$ of the instrument by a guide $i$, of arc shape. Device $d$ bears against the end of a rod $k$ connected to the indicator actuating device $b$, which is under the action of a spring $l$ which is stronger than the spring $g$ and therefore operates to press the feeler $a$ outwards. The member —$b$— together with the rod —$k$— and the intervening connecting piece, together are all in axial alinement and together form an indicator actuating means.

On the other end of the head $h$, a fixed touch bolt $m$ is arranged, which is secured in place by a cap nut $n$.

Regarding the showing of the guide member $i$ in Fig. 1 the part $p$ is split (or cleft) and the two parts lie flat against each other. The upper ends of the parts $p$ are semicircular in cross section and are screw threaded to receive the casing $k'$. The lower ends of the parts $p$ are flattened as at $q$ and when placed together form a rectangular shaped guide having a width equal to that of a guide slot $s$ in the member $o$, for slidingly guiding the member $o$, (see Figs. 1 and 3). The guide for the part $d$ is curved along the arc of a circle and is cut one-half out of each of the inner surfaces of the lower portions $q$ of the two parts $p$. The parts $p$, $q$ are not hatched on the drawing since the cutting plane passes through the split portions.

In order finally, that it may be possible in measuring the clear width of hollow cylinders and the like, to always measure with certainty on the largest diameter, a stop $o$ is arranged on the head $h$, so as to be movable longitudinally thereof. This stop is under the action of a spring $t$ which presses it outward, in connection wherewith the movement is limited by the nut $f$. The stop $o$ is prevented from turning by the pieces $p$ that are held in head $h$, by pin $r$ and are provided with parallel surfaces. The part $q$ is inserted in a corresponding opening in the head $h$ and there secured by the transverse pin $r$. The stop $o$ is guided on the part $q$ by means of the slot $s$ therein and thereby prevented from turning.

The stop o is formed by turning it on its two ends around the central axis in the form of an arc of a circle, and has outwardly rounded off edges, so that even when the instrument is placed obliquely, the measurement can be made in the largest diameter by having its rounded off edges contacting with the inner surface of the opening to be measured.

I claim:

1. In a micrometer gauge, a movable feeler, indicator actuating means, an arc-shaped device for directly transmitting motion from the feeler to the indicator actuating means, and an arc-shaped guide for loosely guiding the arc-shaped device.

2. In a micrometer gauge, a movable feeler, indicator actuating means, an arc-shaped device for directly transmitting motion from the feeler to the indicator actuating means, and an arc-shaped guide for loosely guiding the arc-shaped device, the motion of the feeler being at an angle to that of the indicator actuating device.

3. In a micrometer gauge, a movable feeler, indicator actuating means, an arc-shaped device for directly transmitting motion from the feeler to the indicator actuating means, an arc-shaped guide for loosely guiding the arc-shaped device, and a double ended stop positioned on the feeler, the stop having its ends rounded and lying in the circumference of a circle having its center in the axis of the feeler.

In testimony whereof I have signed my name to this specification.

RICHARD DAIKER.